(12) United States Patent
Nair et al.

(10) Patent No.: US 11,618,800 B2
(45) Date of Patent: Apr. 4, 2023

(54) COMPOSITION AND METHOD FOR LAMINATION OF SILICON DOMINANT ELECTRODES

(71) Applicant: ENEVATE CORPORATION, Irvine, CA (US)

(72) Inventors: Ambica Nair, Irvine, CA (US); Giulia Canton, Irvine, CA (US); Ian Browne, Irvine, CA (US); Michael Buet, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/553,369

(22) Filed: Dec. 16, 2021

(65) Prior Publication Data

US 2022/0106425 A1  Apr. 7, 2022

Related U.S. Application Data

(63) Continuation of application No. 16/548,476, filed on Aug. 22, 2019, now Pat. No. 11,203,657.

(51) Int. Cl.
| | |
|---|---|
| *C08F 277/00* | (2006.01) |
| *H01M 4/04* | (2006.01) |
| *H01M 4/36* | (2006.01) |
| *H01M 4/587* | (2010.01) |
| *H01M 4/66* | (2006.01) |
| *H01M 4/1395* | (2010.01) |
| *H01M 4/38* | (2006.01) |
| *H01M 4/02* | (2006.01) |

(52) U.S. Cl.
CPC ............ *C08F 277/00* (2013.01); *H01M 4/043* (2013.01); *H01M 4/0404* (2013.01); *H01M 4/0471* (2013.01); *H01M 4/1395* (2013.01); *H01M 4/364* (2013.01); *H01M 4/386* (2013.01); *H01M 4/587* (2013.01); *H01M 4/661* (2013.01); *H01M 4/667* (2013.01); *H01M 4/668* (2013.01); *H01M 2004/027* (2013.01)

(58) Field of Classification Search
CPC ............... C08F 277/00; H01M 4/0404; H01M 4/0471; H01M 4/043; H01M 4/364; H01M 4/587; H01M 4/661; H01M 4/1395; H01M 4/667; H01M 4/668; H01M 4/386
See application file for complete search history.

(56) References Cited

U.S. PATENT DOCUMENTS 4,506,056 A * 3/1985 Gaylord ................ C08F 291/00
524/445

* cited by examiner

*Primary Examiner* — Sarah A. Slifka
(74) *Attorney, Agent, or Firm* — McAndrews, Held & Malloy, Ltd.

(57) ABSTRACT

Disclosed are maleic anhydride-grafted cyclic olefin copolymers, methods for preparing maleic anhydride-grafted cyclic olefin copolymers, low temperature methods for laminating anodes comprising the maleic anhydride-grafted cyclic olefin copolymers, and anodes and alkali ion batteries that comprise the maleic anhydride-grafted cyclic olefin copolymers.

16 Claims, 3 Drawing Sheets

COMPOSITION AND METHOD FOR LAMINATION OF SILICON DOMINANT ELECTRODES

CROSS-REFERENCE TO RELATED APPLICATIONS/INCORPORATION BY REFERENCE

This application is a continuation of and claims the benefit of U.S. application Ser. No. 16/548,476 filed Aug. 22, 2019, pending (now allowed). The entirety of the above referenced application is hereby incorporated by reference.

FIELD

Aspects of the present disclosure generally relate to energy generation and storage. More specifically, embodiments of the disclosure relate to a grafted copolymer composition, methods of preparing the grafted copolymer composition, methods for using the grafted copolymer as an electrode attachment substance, and methods for low temperature lamination of electrodes, including silicon dominant anodes.

BACKGROUND

Conventional approaches for design and manufacture of battery electrodes may be costly, cumbersome, and/or inefficient—e.g., they may be complex, resource-intensive, and/or time consuming to implement, and may limit battery lifetime and impede advancement of the technology.

Further limitations and disadvantages of conventional and traditional approaches will become apparent to one of skill in the art, through comparison of such systems with some aspects and embodiments of the present disclosure as set forth in the remainder of the present application with reference to the drawings.

BRIEF SUMMARY

A maleic anhydride-grafted cyclic olefin copolymer, methods for preparing a maleic anhydride-grafted cyclic olefin copolymer, an anode for alkali ion batteries, and low-temperature methods for attaching electrode active materials to current collectors substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

Figure 1:
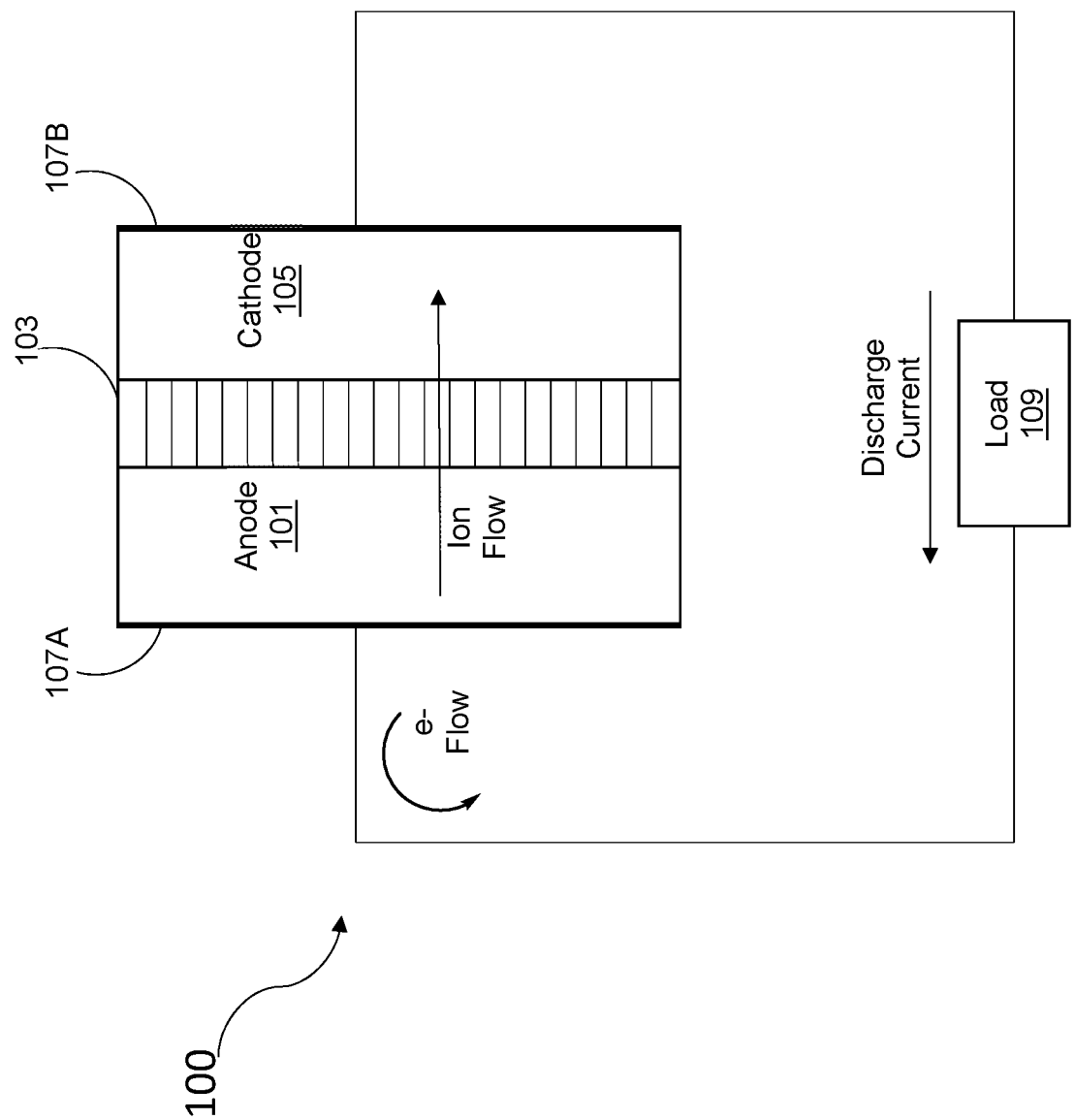
FIG. 1 is a diagram of a battery with an ultra-high voltage cobalt-free cathode, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode.

The anode 101 and cathode 105, along with the current collectors 107A and 107B may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode 105 are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100° C. to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in the rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example, which may be referred to as silicon dominant anodes.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 play a role in determining the reliability and energy density possible for the battery 100. The energy, power, cost, and safety of current Li-ion batteries needs to be improved in order to compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

A rechargeable battery (e.g., a lithium ion rechargeable battery) typically comprises an anode (negative electrode), cathode (positive electrode), separator, electrolyte, and housing. In the assembly of the electrodes, an attachment substance (e.g., adhesive) can be used to couple (i.e., adhere or "laminate") an electrochemically active material (e.g., carbon, silicon carbon composite, or silicon dominant active material, including films) to a current collector, such as copper (e.g., copper sheet or foil) to form electrical contact between the components. The electrode attachment substance can adhere the active material and current collector together to prevent delamination between them. The electrode attachment substance can be placed or sandwiched between the active material and the current collector to form the electrode. The electrodes produced can include the active material (e.g., silicon carbon composite film), the attachment substance, and the current collector.

Prior electrode attachment substances include polymers such as polyamideimide (PAI), polyvinylidene fluoride (PVDF), carboxymethyl cellulose (CMC), polyacrylic acid (PAA), styrene butadiene rubber (SBR), polypyrrole (PPy), poly(vinylidene fluoride)-tetrafluoroethylene-propylene (PVDF-TFE-P), polyacrylonitrile, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polymethacrylic acid, nitrile-butadiene rubber, polystyrene, polycarbonate, and a copolymer of vinylidene fluoride and hexafluoro propylene. The electrode attachment substance is typically a thermoset polymer or a thermoplastic polymer, and may be amorphous, semi-crystalline, or crystalline. Nevertheless, and as described herein, alternative electrode attachment substances can provide for improved electrodes, methods for preparing electrodes, and batteries and battery manufacturing methods.

For example, while PAI has been successfully used as an attachment substance, it has a glass transition temperature (Tg) of about 280° C. and when used to adhere/laminate an anode active material and a current collector, requires a temperature exceeding 250° C. These relatively high process temperatures lead to higher material and process cost, and require careful protection of the current collector in order to prevent oxidation, which can lead to welding failures during cell assembly.

As described and illustrated herein, cyclic olefin copolymer (COC) refers to a series of thermoplastic material that generally possess lower Tg, good solubility in readily available solvents, and good adhesion to electrode active materials such as silicon carbon composite and silicon dominant anodes relative to the attachment substances representative of the state of the art. Further, commercially available COC typically costs less than polymers known and used as electrode attachment substances. Despite these advantages, COC typically exhibits relatively poor adhesive properties to current collector materials, such as copper which has discouraged its use in such applications.

As illustrated in the disclosure and example embodiments below, grafting the COC material with maleic anhydride provides an unexpected enhancement of the adhesion properties of the grafted COC to current collectors, such as copper, while maintaining good adhesive properties to electrode active materials and favorable Tg ranges. Without being bound by theory, the mechanism of this improved adhesion may relate to the chemical interaction between surface oxides at the surface/interface of the current collector and the carboxylic acid moieties resulting from hydrolysis of the anhydride functional group of the maleic anhydride-grafted COC. In embodiments, the maleic anhydride-grafted COC and its use as an electrode adhesive/attachment substance provides for methods that comprise lower temperatures, which may reduce overall process cost and may reduce the tendency of the current collector to oxidize.

Cyclic olefin copolymers (COC) can be produced by chain copolymerization of cyclic monomers such as 8,9,10-trinorborn-2-ene (norbornene, or bicyclo[2.2.1]hept-2-ene) or 1,2,3,4,4a,5,8,8a-octahydro-1,4:5,8-dimethanonaphthalene (tetracyclododecene) with ethene or by ring-opening metathesis polymerization (ROMP) of various cyclic monomers followed by hydrogenation. A variety of cyclic olefin copolymers, in differing grades, are commercially available and can be used in the embodiments described herein, including COC from TOPAS Advanced Polymer (Topas® COC), Mitsui Chemicals, Inc. (APEL™ cyclo olefin copolymer), JSR Corporation (ARTON), and Zeon Chemical (ZEONEX® and ZEONOR® cyclo olefin polymers). See also, J. Y. Shin, et al., Pure Appl. Chem., Vol. 77, No. 5, pp. 801-814 (2005).

In some embodiments, the cyclic olefin copolymer has a general structure according to Formula I:

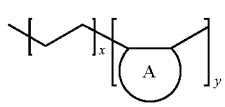

(I)

wherein A is a $C_5$-$C_{12}$ carbocyclic ring, optionally substituted with one or more C1-6 alkyl, C2-6 alkenyl, or aryl groups; and x and y are integers, wherein the ratio of x:y falls within a range of about 6:1 to about 1.5:1.

The term "carbocyclic ring" as used herein refers to a 5 to 12 membered ring, a fused ring system, or a bridged bicyclic ring system in which all of the atoms that form the ring are carbon atoms. The carbocyclic ring may be saturated, unsaturated or aromatic. Examples of carbocyclic ring systems include, but are not limited to, cyclopentyl, cyclopentenyl, cyclohexyl, cyclohexenyl, phenyl, naphthyl, norbornyl (bicyclo[2.2.1]heptanyl), norbornenyl (bicyclo[2.2.1]hept-2-enyl), bicyclo[3.3.0]octyl, tetracyclododecanyl, tetracyclododecenyl, and tetrahydronaphthyl.

The term "aryl" includes any stable, monocyclic or bicyclic carbon ring of up to 6 atoms in each ring, wherein at least one ring is aromatic. Examples of such aryl groups include, but are not limited to, phenyl, naphthyl and tetrahydronaphthyl, optionally substituted with one or more C1-6 alkyl or C2-6 alkenyl groups.

A number of methods can be used to prepare a maleic anhydride-grafted cyclic olefin copolymer, including grafting in solution, grafting in melt by reactive extrusion techniques, grafting in the solid state, photo-induced surface grafting, and plasma-induced surface grafting. In an example described below, separate solutions of maleic anhydride and a COC are prepared and mixed. A radical initiator is added to the maleic anhydride and COC mixture and the reaction is maintained under conditions that generate the maleic anhydride-grafted COC.

A variety of radical initiators may be used in the preparative grafting method including, for example, azo compounds and peroxides. For example, upon application of heat or irradiation, azo compounds of the general structure R—N=N—R' can generate nitrogen gas two carbon-centered radicals (R* and R'*). Similarly, breaking the O—O bond in peroxides, such as organic peroxides (e.g., hyperoxides, peroxy acids and esters, diacyl peroxides, and dialkyl peroxides), can generate two radicals. In some embodiments the radical initiator can include the non-limiting examples of tert-amyl peroxybenzoate, 4,4-azobis (4-cyanovaleric acid), 1,1'-azobis(cyclohexanecarbonitrile), 2,2'-azobisisobutyronitrile (AIBN), 1,1'-azobiscyclohexanecarbonitrile (ACHN), benzoyl peroxide, methyl ethyl keonte peroxide, 2,2-bis(tert-butylperoxy)butane, 1,1-bis (tert-butylperoxy)cyclohexane, 2,5-bis(tert-butylperoxy)-2, 5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, and potassium persulfate.

In accordance with the disclosure, a maleic anhydride-grafted COC can be prepared by maintaining a reaction mixture comprising maleic anhydride, COC, and a radical initiator under conditions that allow the formation of the maleic anhydride-grafted COC. Reaction conditions may be adjusted based on the solvent(s) (if used) in the reaction mixture, the concentration(s) of the maleic anhydride and/or the COC, the physical characteristics of the particular COC used in the method, and/or reaction kinetics.

Reaction temperature, for example, may range from 40° C. to 150° C., 40° C. to 120° C., or 40° C. to 100° C. In some example embodiments (e.g., embodiments that do not include solvent), the temperature may be near or above the melting temperature of the polymer, for example from 50° C. to 150° C., (i.e., 50, 55, 60, 65, 70, 75, 80, 85, 90, 95, 100, 105, 110, 115, 120, 125, 130, 135, 140, 145, or 150° C.) depending on the polymer. In some example embodiments (e.g., embodiments that include solvent), the temperature may range from 50° C. to 60° C. or, in further example embodiments, may be about 55° C. Reaction time may range in some example embodiments from minutes to hours depending on the reaction components and conditions. In some example embodiments (e.g., depending on the initiator used in the reaction) the reaction may be completed in less than an hour, ranging from about 5-60 minutes, (i.e., 5, 10, 15, 20, 25, 30, 35, 40, 45, 50, 55, or less than 60 minutes). In some example embodiments, the reaction may be completed in several hours, including from more than 1 hour to about 20 hours (i.e., 2, 3, 4, 5, 6, 7, 8, 9, 10, 11, 12, 13, 14, 15, 16, 17, 18, 19, or 20 hours). In some example embodiments the reaction time may range from about 8 hours to about 20 hours. In some example embodiments, the reaction time may be about 16 hours. Relative amounts of maleic anhydride and COC may also vary, depending on the desired amount of maleic anhydride engraftment. In some example embodiments the amount of maleic anhydride may vary from about 0.5% to about 20% (i.e., 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20%) (wt/wt %) relative to the amount of COC.

In example embodiments, the extent of reaction and/or the amount of maleic anhydride in the maleic anhydride-grafted COC can be determined using any technique known in the art including, for example, FT-IR and NMR (e.g., $^{13}$C-NMR). See, e.g., J. Y. Shin, et al., Pure Appl. Chem., Vol. 77, No. 5, pp. 801-814 (2005); and Berzin, et al., J. Polym. Eng., 2013; 33(8): 673-682.

In accordance with the disclosure, maleic anhydride-grafted COC can be used as an electrode attachment substance. In some example embodiments, a solution of the maleic anhydride-grafted COC can be prepared in a solvent that can include a suitable organic solvent or an organic cosolvent system (e.g., cyclohexane, xylene, toluene, N-methyl pyrrolidone (NMP), and the like, including mixtures thereof). The solution can be applied or coated onto the current collector and/or the electrode active material (e.g., a carbon silicon composite or silicon dominant anode film). In certain example embodiments, the coating of solution has a thickness of about 1 micron to about 100 microns. For example, the coating of solution may have a thickness of about 1 micron to about 50 microns and, in some embodiments, can be from about 1 to about 10 microns when dried. The electrode material and current collector can then be placed into contact with one another such that the solution, or dried maleic anhydride-grafted COC, is sandwiched between the film and current collector. As described herein, at least some of the solution may be absorbed into porosity of the film. Since the solution may be absorbed into the film, the amount of solution coated onto the current collector or film may vary depending on the thickness. Excess solution may be blotted using an absorbent material. The solution can then go through one or more drying steps to remove the solvent from the solution leaving the maleic anhydride-grafted COC.

In some example embodiments, the electrode can include a film with an electrochemically active material on both sides of the current collector. For example, a first electrode attachment substance comprising a maleic anhydride-grafted COC can be sandwiched between a first film with an electrochemically active material and a first side of the current collector, and a second electrode attachment substance (which may be the same or different maleic anhydride-grafted COC) can be sandwiched between a second film with an electrochemically active material and a second side of the current collector.

As mentioned above, some example embodiments can include an active material having a porosity that may range from about 1% to about 70% or about 5% to about 50% by volume porosity. In such embodiments, the maleic anhydride-grafted COC may at least partially be absorbed into the porosity such that at least some of the electrode attachment substance is within the porosity of the active material (e.g., by capillary action). For example, a solution with the maleic anhydride-grafted COC can be absorbed into the porosity, and the solution can be dried, leaving at least some amount of the maleic anhydride-grafted COC within the porosity of the active material. The maleic anhydride-grafted COC within the porosity of the active material (e.g., film) can increase the mechanical durability. As such, example embodiments provide a composite active material that includes the maleic anhydride-grafted COC. In some further example embodiments, the maleic anhydride-grafted COC may extend through the entire thickness of the active material. For example, a substantial portion of the porosity may be open such that the active material (e.g., film) is permeable to a solution that includes the maleic anhydride-grafted COC. Thus, example embodiments provide for the maleic anhydride-grafted COC as a continuous phase within the active material. In other embodiments, the maleic anhydride-grafted COC may only extend partially through or into the thickness of the active material.

In example embodiments, the maleic anhydride-grafted COC is substantially electrically nonconductive (e.g., the maleic anhydride-grafted COC has an electrical conductivity such that, in use in an electrochemical cell, the maleic anhydride-grafted COC does not conduct electricity). Although the maleic anhydride-grafted COC may be substantially electrically nonconductive, the electrochemical cell can result in better performance than if the maleic anhydride-grafted COC substance was electrically conductive.

Pressure may be applied to press the current collector and the film together with the maleic anhydride-grafted COC substance between. In certain example embodiments, pressure may be applied between above atmospheric pressure (i.e., above 20 or 30 psi) to about 5000 psi, or about 2000 psi to about 4000 psi, or about 3000 psi to about 4000 psi. Pressure can be applied by any suitable method such as, for example, by putting the film, maleic anhydride-grafted COC, and current collector through rolls such as calendaring rolls, or in a press.

An advantage to using an electrode attachment substance, such as maleic anhydride-grafted COC between the active material, particularly a film, and the current collector is that the complete assembly can be more flexible than the film without the current collector and attachment substance. For example, in certain example embodiments, the active material film can be brittle and cannot be deformed (e.g., bent) significantly without cracking and failure of the film. When the same film is coupled with or attached to a current collector with the maleic anhydride-grafted COC, the complete assembly can be bent or deformed to a further extent compared to a film that is not coupled with or attached to a current collector without cracking or failure of the film. In certain example embodiments, the complete electrode assembly can be rolled to form a rolled-type (e.g., wound) battery.

In accordance with the disclosure, a maleic anhydride-grafted COC is prepared and described and is capable of functioning as an electrode attachment substance that couples a current collector to an electrode active material.

As one example for preparing a maleic anhydride-grafted COC, an amount of cyclic olefin copolymer (COC) (5017 grade from TOPAS) is dissolved at a concentration of 10% (w/w) in a mixture of 90% cyclohexane (CH) and 10% toluene at 40° C., and is charged to a reaction vessel under inert atmosphere ($Ar_{(g)}$). In a separate vessel, an amount of maleic anhydride (MA) is dissolved in a volume of toluene and is added to the COC solution (e.g., from about 0.5-20% (wt/wt) of MA to COC).

The radical initiator is prepared in a separate vessel. A 1% solution of azobisisobutyronitrile (AIBN) (as a free radical initiator) is prepared by dissolving AIBN in toluene. An aliquot of the 1% AIBN solution is added to the reaction mixture comprising the COC and maleic anhydride. The radical initiator is added to the reaction mixture and is heated to 55° C. with stirring for 16 hours, under inert atmosphere ($Ar_{(g)}$). Upon completion of the reaction, the maleic anhydride-grafted COC is precipitated in acetone. The resulting solid maleic anhydride-grafted COC is filtered and washed with acetone to remove unreacted maleic anhydride and initiator. The washed maleic anhydride-grafted COC is dried at 110° C. for 16 hour at ambient (atmospheric) pressure.

Figure 2:
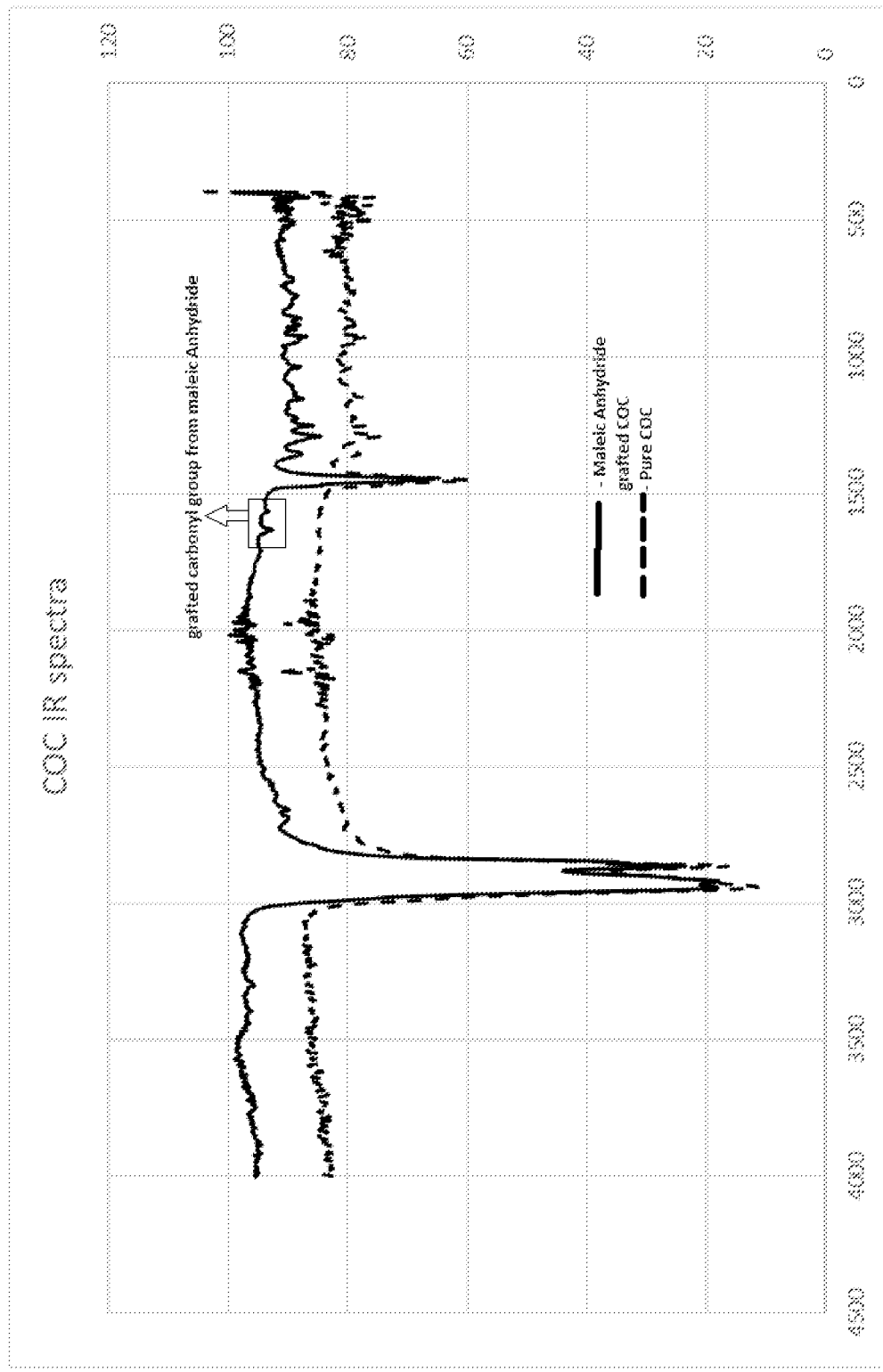
FIG. 2 depicts a representative FT-IR spectral overlay trace that demonstrates the successful engraftment of maleic anhydride with a cyclic olefin copolymer, in accordance with an example embodiment of the disclosure.

FIG. 2 depicts an FT-IR overlay analysis that demonstrates the maleic anhydride-grafted COC was successfully prepared. The solid trace corresponds to the spectrum for the maleic anhydride-grafted COC and is characterized by the appearance of peaks corresponding to the carbonyl group(s) from the anhydride or carboxylic acid. Those peaks distinguish the maleic anhydride-grafted COC from the precursor COC, which lacks the distinct carbonyl resonances (broken line trace in FIG. 2).

In accordance with the disclosure, the maleic anhydride-grafted COC prepared above can be used as an electrode attachment substance in the preparation of anode and/or cathodes. As an illustrative example of such a method, an amount of the dried maleic anhydride-grafted COC is dissolved at a concentration of 7.5% in a cyclohexane and toluene solvent system (w/w 9:1). The maleic anhydride-grafted COC solution is coated on a copper substrate (current collector) with a doctor blade and is dried at 110° C. for 16 hours. The maleic anhydride-grafted COC layer, after drying, has a thickness of about 3 microns.

Figure 3:
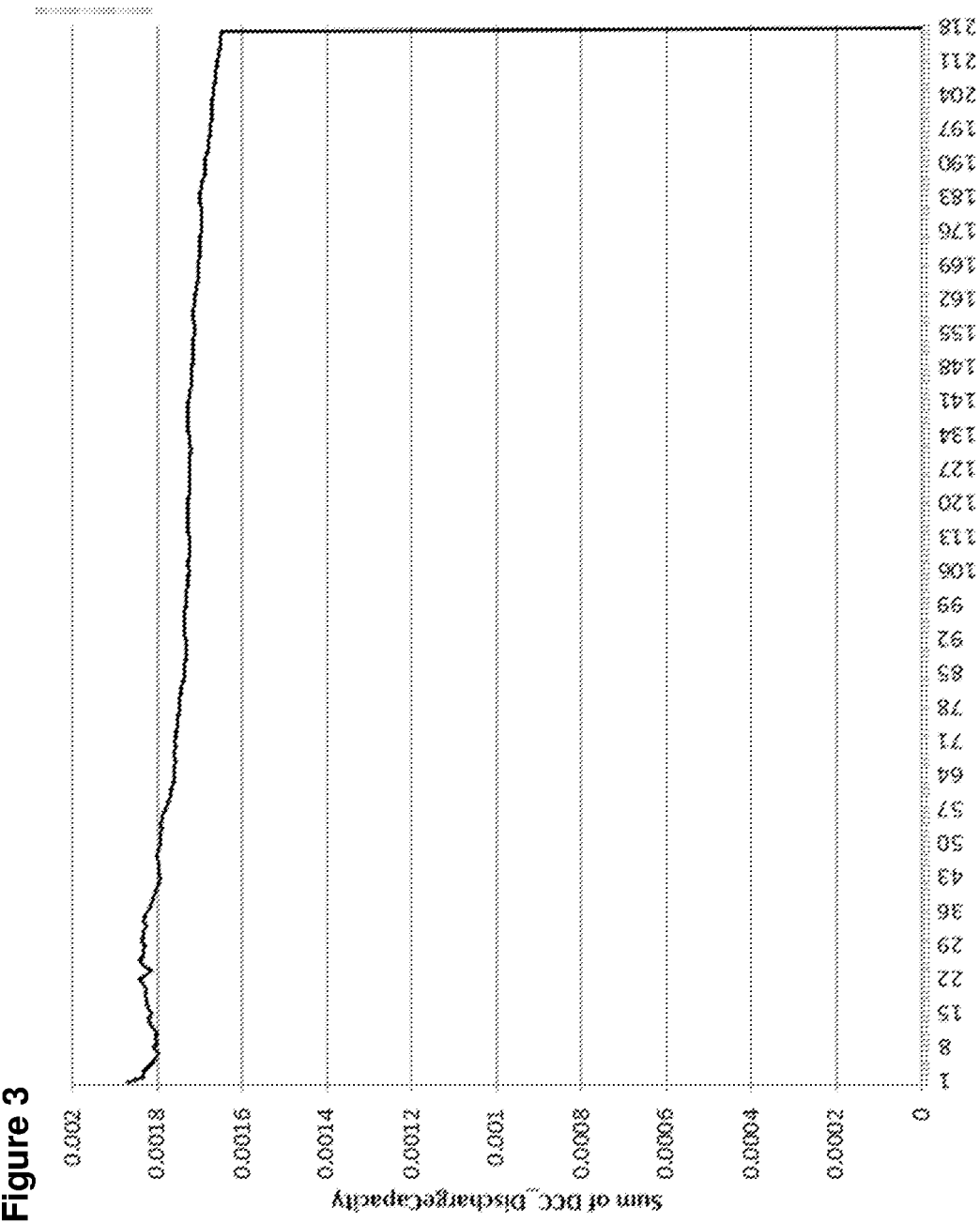
FIG. 3 illustrates the cycle voltage profile of a battery with an anode comprising a maleic-anhydride grafted cyclic olefin copolymer that attaches the current collector to the anode active material, in accordance with an example embodiment of the disclosure.

The dried, maleic anhydride-grafted COC-coated copper substrate and a silicon carbon composite film are attached (laminated) by applying pressure (4000 psi) and heat (150° C.) for 50 seconds. The resulting anodes are punched to form discs and assembled into coin cells with a cathode disc comprising 92% Ni-rich lithium nickel cobalt oxide (NCA), 4% conductive carbon additive, and 4% polyvinylidene fluoride PVDF, coated on 15 micron aluminum foil with a loading of 23 mg/cm$^2$. The separator is a porous polypropylene film, and the electrolyte composed of $LiPF_6$ and carbonate esters. The cells are cycled at 0.33 C charge to 4.2V and 2.5 C discharge to 3.1V (see, FIG. 3).

Consistent with the above disclosure, the maleic anhydride-grafted COC provides several advantages relative to existing electrode attachments substances, including, 1) increased adhesive properties to both silicon-based active material (e.g., silicon carbon composite and silicon dominant films), and current collector materials (e.g., copper); 2) low temperature processes for preparing laminated electrodes; 3) reduced oxidation of current collectors; 4) reduced welding failures during battery assembly; and 5) reduced cost.

In an example embodiment of the disclosure, a maleic anhydride-grafted cyclic olefin copolymer and method for preparing the same is described for use as an electrode attachment substance in anodes and cathodes for alkali ion batteries. The methods may comprise mixing a solution comprising a cyclic olefin copolymer with a solution of maleic anhydride to form a reaction mixture; adding a radical initiator to the reaction mixture; and maintaining the reaction mixture under conditions that allow for the formation of the maleic anhydride-grafted cyclic olefin copolymer. In another example, the cyclic olefin copolymer has a structure according to Formula I:

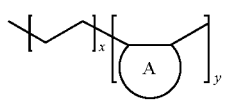

(I)

wherein A is a $C_5$-$C_{12}$ carbocyclic ring, optionally substituted with one or more C1-6 alkyl, C2-6 alkenyl, or aryl groups; and x and y are integers, wherein the ratio of x:y falls within a range of about 6:1 to about 1.5:1.

In another example embodiment of the disclosure, a method of forming an electrode is described. The method may comprise coating a current collector with a solution comprising a maleic anhydride-grafted cyclic olefin copolymer; drying the coated current collector; and applying pressure and heat to the coated current collector and a solid film comprising electrochemically active material under conditions to adhere the coated current collector to the solid film to form the electrode. In another example, the method provides for the manufacture of an electrode that may be an anode, a silicon carbon composite anode, or a silicon dominant anode.

In another example embodiment of the disclosure, an anode is described. The anode may comprise: a current collector; a solid film comprising electrochemically active material in electrical communication with the current collector, the film comprising a silicon carbon composite film; and a layer of material between the current collector and the film, wherein the layer comprises a maleic anhydride-grafted cyclic olefin copolymer that adheres the film to the current collector. In another example, the anode may be a silicon carbon composite anode, or a silicon dominant anode.

In another example embodiment of the disclosure, a method of forming a battery is described. The method may comprise providing an anode, a cathode, and a separator, the anode comprising a current collector coated with a maleic anhydride-grafted cyclic olefin copolymer adhered to an anode substrate comprising a silicon carbon composite material; and assembling the cathode, the separator, and the anode, with an electrolyte to form the battery.

In another example embodiment of the disclosure, a battery is described. The battery may comprise an anode, a cathode, an electrolyte, and a separator, the anode comprising a current collector coated with a maleic anhydride-grafted cyclic olefin copolymer adhered to an anode substrate comprising a silicon carbon composite material.

As utilized herein the term "battery" may be used to indicate a single electrochemical cell, a plurality of electrochemical cells formed into a module, and/or a plurality of modules formed into a pack. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery or device is "operable" to perform a function whenever the battery or device comprises the necessary elements to perform the function, regardless of whether performance of the function is disabled or not enabled (e.g., by a user-configurable setting, factory trim or configuration, etc.).

While the present invention has been described with reference to certain aspects, embodiments, and illustrative examples, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A solid film comprising an electrochemically active material and a polymer layer comprising a maleic anhydride-grafted cyclic olefin copolymer.

2. The solid film of claim 1 wherein the electrochemically active material is a silicon dominant material.

3. The solid film according to claim 1, wherein the polymer layer has a final thickness of about 2 microns to about 5 microns.

4. The solid film according to claim 3, wherein the polymer layer has a final thickness of about 3 microns.

5. The solid film according to claim 1, wherein the cyclic olefin copolymer has a structure according to Formula I:

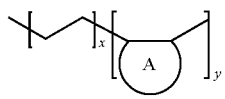
(I)

wherein A is a $C_5$-$C_{12}$ carbocyclic ring, optionally substituted with one or more C1-6 alkyl, C2-6 alkenyl, or aryl groups; and x and y are integers, wherein the ratio of x:y falls within a range of about 6:1 to about 1.5:1.

6. The solid film according to claim 5, wherein A is selected from the group consisting of cyclopentyl, tetracyclododecenes, tetracyclododecenes, norbornanes (bicyclo[2.2.1]heptanes), and norbornenes (bicyclo[2.2.1]hept-2-enes).

7. The solid film according to claim 1, wherein said maleic anhydride-grafted cyclic olefin copolymer is prepared by mixing a solution comprising a cyclic olefin copolymer with a solution of maleic anhydride to form a reaction mixture;

adding a radical initiator to the reaction mixture; and maintaining the reaction mixture under conditions that allow for the formation of the maleic anhydride-grafted olefin copolymer.

8. The solid film according to claim 7, wherein the radical initiator is selected from the group consisting of azo compounds and peroxides.

9. The solid film according to claim 8, wherein the radical initiator is azobisisobutyronitrile (AIBN).

10. The solid film according to claim 7, wherein the reaction mixture comprises a cyclohexane/toluene solvent system.

11. The solid film according to claim 7, wherein the conditions that allow for the formation of the maleic anhydride-grafted olefin copolymer comprise heating the reaction mixture to a temperature range of 40° C. to 100° C.

12. The solid film according to claim 11, wherein the conditions that allow for the formation of the maleic anhydride-grafted olefin copolymer comprise heating the reaction mixture to a temperature range of 50° C. to 60° C.

13. The solid film according to claim 12, wherein the conditions that allow for the formation of the maleic anhydride-grafted olefin copolymer comprise heating the reaction mixture to a temperature range of about 55° C.

14. The solid film according to claim 7, wherein the conditions that allow for the formation of the maleic anhydride-grafted olefin copolymer are maintained for about 8 hours to about 20 hours.

15. The solid film according to claim 14, wherein the conditions that allow for the formation of the maleic anhydride-grafted olefin copolymer are maintained for about 16 hours.

16. The solid film according to claim 7, wherein the conditions that allow for the formation of the maleic anhydride-grafted olefin copolymer comprise heating the reaction mixture to a temperature range of 50° C. to 60° C. for about 16 hours.

* * * * *